INVENTORS
SHELLEY KRASNOW,
LEON F. CURTISS,
ATTORNEY

Jan. 31, 1950     S. KRASNOW ET AL     2,495,736

RADIANT ENERGY ACTIVATION

Original Filed Oct. 24, 1939     2 Sheets-Sheet 2

INVENTORS
SHELLEY KRASNOW,
LEON F. CURTISS,

By Shelley Krasnow

ATTORNEY

Patented Jan. 31, 1950

2,495,736

UNITED STATES PATENT OFFICE 2,495,736

RADIANT ENERGY ACTIVATION

Shelley Krasnow, Arlington County, Va., and Leon F. Curtiss, Montgomery County, Md., assignors, by mesne assignments, to said Krasnow Original application October 24, 1939, Serial No. 301,078. Divided and this application March 3, 1942, Serial No. 433,212

11 Claims. (Cl. 250—83.6)

This is a division of copending application Serial No. 301,078, filed Oct. 24, 1939.

This invention relates to an improved method and apparatus for measuring radioactivity, and has particular reference to a method and apparatus for measuring radioactivity in inaccessible locations, such as in bore-holes or at considerable depths in bodies of water.

One object of the invention is to provide a method and apparatus useful for locating deposits of minerals having radioactive properties. Another object of the invention is to provide an apparatus by which one may measure radioactive properties continuously from the top to the bottom of a bore-hole, and have both an immediate indication, and a permanent record, of the radioactivity at various depths.

Another object of the invention is to introduce radioactive material into a borehole so that it is exposed to the layers thereof, by which the radioactive material will be selectively absorbed by these layers, and afterwards identify the layers by radioactive measurements making use of the differences of residual radioactivity.

In locating deposits of radioactive minerals it is often the custom to drill a number of bore-holes in localities where such deposits might exist. It is further the practice to bring samples or cores of the drilled material to the surface of the earth, and there examine them for radioactivity by well known methods and apparatus. This method has several drawbacks. First, a deposit of ore may exist close to the bore-hole, but not be traversed by it, by which the deposit will be missed. Second, it is possible to make an error in ascertaining the exact depth from which a core or sample has been taken. Finally, it is rarely possible to bring all of the core to the surface, a certain percentage always being lost in the drilling or handling.

It is further known that deposits of petroleum are often markedly radioactive as compared with the surrounding rock material. This is believed to be due to the superior absorptive property of petroleum for radium emanation. Natural gas and ground water are also known to be somewhat more radioactive than their surrounding rock material. In drilling for either petroleum or natural gas, or ground water, it is desirable to know the exact level at which the strata having these are traversed by the drilled hole. This is often difficult to determine, particularly when drilling has been done by the "rotary" method, in which the use of mud under pressure tends to wall off the strata. Often too, the drilled hole will be lined with a metallic casing, which casing by accident or intention may seal off strata having the desired fluid.

It is the intention in the present invention to provide an apparatus so sensitive, and a method appropriate to its use, that the relatively faint radioactivity of oil and ground water may be detected in place in a bore-hole. An apparatus sensitive enough to serve this function will by its nature differentiate between the different though faint radioactivities of the rock material. Rock materials, dependent upon their origin and dependent upon the minerals contained in them, have different radioactivities. Thus, it has been found that granite, shales having organic materials embodied therein, sedimentary rocks containing zircon, and rock materials having mica associated with them, are all slightly more radioactive than for example limestone or chalk deposits. Sandstones will differ in their natural radioactivity, depending upon the minerals contaminating them. Organic deposits, such as coal, oil and natural gas, as mentioned above, petrified vegetable matter, etc., will show higher radioactivities than for instance limestone and chalk. Thus, with an apparatus as sensitive as that described herein it will be possible to differentiate between different layers of rock by the differences in their radioactivities. Each layer in an area will have a characteristic radioactivity, just as it has a characteristic chemical composition, and for the same reason. Thus, the radioactivity of a layer will serve as a variety of marker, serving to identify the layer wherever it might be in an area.

Further objects of the invention described are to obviate the difficulties mentioned and secure the advantages mentioned above.

Reference is had to the accompanying drawings in which.

In certain localities, petroleum in particular may be found to have a limited radioactivity; so limited that detecting its presence with the apparatus shown becomes difficult. In these cases advantage may be taken of the superior absorptive power of petroleum for radium emanation gas. Radium emanation gas may be introduced at the surface of the bore-hole, being pumped into it so as to reach the lowest level. The bore-hole may then be cleaned out with a suitable fluid, such as water, and a test made for radioactivity in the manner described previously. It will be seen that if any petroleum exists in the bore-hole, it will absorb radium emanation gas in greater proportion than the other strata, and will therefore exhibit a stronger radioactivity.

Figure 2:
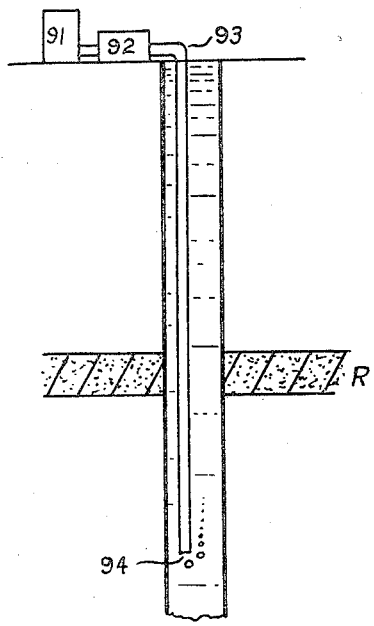
Figure 2 shows a means of rendering strata artificially radioactive.

Figure 2 shows an arrangement for performing the above operation. Here a gas container is shown schematically as 91. This contains the radium emanation gas (sometimes known as "radon"). A pump shown schematically as 92 serves to draw the gas from the tank 91 and pump it down through conduit 93. The gas emerges at the opening 94 of the conduit 93. A layer having superior absorptive properties for radon gas, such as an oil bearing layer, will absorb the gas more rapidly than the other layers. Such an absorbing layer is shown as R. In this instance the bore-hole is shown as being full of fluid through which the gas is bubbled.

While radon gas has been mentioned as a suitable material, it will be appreciated that other substances having radioactive properties may be used instead. Such other substances may be radioactive salts, either those having a natural radioactivity or those having an artificially excited radioactivity. It is only necessary for the purpose of the invention that the substance used be selectively absorbed by the layer of interest within the bore-hole.

It will further be appreciated that in some cases the lack of absorption of the radioactive materials by a layer will serve to identify the layer. In still other cases, the absorption, due to a layer, may be so great, that the area in the region of the layer will be denuded of radioactive material, and will appear less radioactive than the areas in which the absorption is less. In all cases, however, the differences between layers will be identifiable by the differences in residual radioactivity.

Figure 1:
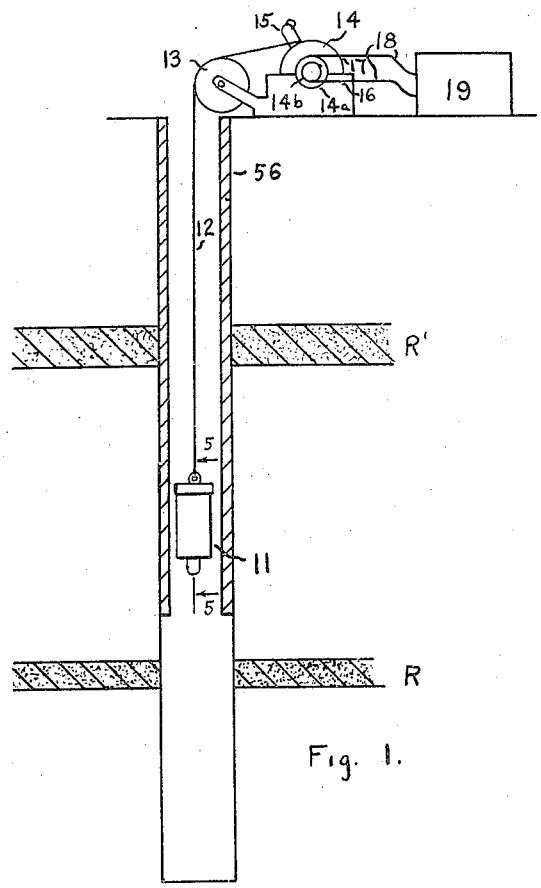
Figure 1 shows schematically a form of apparatus for measuring radioactivity at various depths in a borehole.

A convenient form of apparatus as shown in Figure 1 employs a cartridge 11 suspended in the bore-hole by a conducting cable 12. The cable 12 passes over a measuring wheel 13 and thence onto a reel 14 operated by a crank 15. A pair of slip-rings 14a and 14b fastened to the shaft of the reel 14 have bearing upon them the brushes 16 and 17. These brushes are connected through the medium of wires 18, 18, to a recording element 19.

A member sensitive to the radioactivity manifested by the walls of the borehole, is included within the apparatus 11. This radioactive apparatus can also contain an amplifier or other auxiliary apparatus to facilitate the transmission of the responses from the member sensitive to radioactivity, through the cable 12, to the surface of the earth. The cable 12 is connected ultimately to the recording or indicating element 19 as pointed out above, and this will indicate or record the radioactivity manifested by the walls of the borehole at the depth to which the element 11 is lowered. The details of this and other measuring and detecting methods and apparatus have been shown in applicants' co-pending applications, Serial Nos. 137,380 and 301,078, and need not be repeated here.

It will be noted further that even if a metallic casing such as 56 exists in the bore-hole the presence of a radioactive layer such as R' may be noted because of the easy penetration of the rays through the thickness of metal ordinarily employed for casing.

The detecting apparatus, may be made extremely sensitive to the rays emitted by radio- active substances and so the sometimes faint radioactivity of petroleum, natural gas and ground water detected. As has been pointed out previously, this may be done in spite of any covering of mud or of metallic casing intervening between the walls of the borehole and the cartridge 11. It is in fact, possible to run the cartridge 11 inside of the standard drill pipe used in rotary drilling and thus make measurements with a minimum of disturbance to drilling. Because of the limited absorptive power of the metals customarily used for drilling, it will be possible to detect radioactive rays through the thickness of metal in the drill pipe, or even through the several inch thickness of the drilling tools.

While, from what has been disclosed above, it is evident that strata may be differentiated from each other by means of the quantitative difference in the amount of associated radioactive material, it will be appreciated that strata need not necessarily be widely different in their associated radioactivity to enable one to differentiate them from one another. In cases where the associated radioactivities are not conspicuously different in conducting measurements from one end of the borehole to the other, valuable information may still be obtained by considering the manner in which the radioactivity varies, or phrased differently, the function by which radioactive intensity changes as the depth is altered. This will be found particularly valuable in searching for oil deposits. It will be recalled that petroleum deposits in the natural state have water associated with them. In many cases the water underlies the petroleum, and will have a radioactivity markedly different from that of the petroleum itself. Thus if an apparatus as described above, were lowered past a formation, a sudden change would be observed in passing from rock to petroleum, another sudden change in passing from petroleum to water, and still another sudden change in passing from water to rock. The layers might thus be easily identifiable despite the fact that their radioactivity may be no greater or less than that of most of the rock lining the borehole.

The scope of the invention is defined by the appended claims.

We claim:

1. In a method for indicating conditions within a borehole, the steps of introducing radioactive material in such manner that the said material is retained within the borehole, and of subsequently measuring the radioactive intensity at different portions of the borehole, the measurement so obtained indicating the locality of the material retained, the locality of the said material serving to indicate conditions within the borehole.

2. In a method for performing operations within a deep narrow borehole, the steps of introducing a radioactive material, the said material having penetrating-ray emanating qualities, of causing the material so introduced to be retained in a fashion dependent upon conditions within the borehole, and of subsequently making radioactive measurements at different portions of the borehole so as to discover the said condition.

3. In a method of exploring a borehole to obtain geological information, the steps of introducing a radioactive material, so as to cause the material to be substantially in contact with the material lining the borehole, the radioactive material being selectively absorbed by the materials lining the borehole, of subsequently measuring the radioactive intensity at different localities within the borehole, the measurements so obtained being capable of intercomparison to determine the presence and location of materials with selective absorptive properties.

4. In a method of conducting operations within a deep narrow borehole, the steps of introducing radioactive material into the borehole, of causing a change within the borehole so that rays emitted at a certain level will be different than before the introduction of the radioactive material, of making a measurement of depth to a point within the borehole at which the radioactive conditions have been altered, thereby obtaining information as to conditions at that depth.

5. In a method of investigating material existing within boreholes, the steps of introducing radioactive material into the said borehole and proximate to the point to be investigated, of allowing the radioactive material to act upon the material in the borehole, and to bestow as a consequence upon the said material, an additional radioactive property, of placing an apparatus responsive to radioactivity within the borehole proximate to the point at which the material is to be investigated, and of obtaining a response due to the additional radioactive property, thereby furnishing an indication of the nature and location of the material.

6. In a method of investigating conditions within a deep narrow borehole, the steps of introducing radioactive material within a borehole, of causing the said material to move along the length of the borehole so that it may act upon the different levels thereof, thereby causing in the materials lining the bore hole an augmented radioactivity, dependent upon the reaction between the radioactive material and the material lining the borehole, of making measurements of radioactivity along the length of the borehole and identifying localities where the radioactivity has acted upon the material of the borehole.

7. In a method of conducting geological explorations within a borehole in which a stratum with a limited radioactivity exists whereby the presence of the said stratum is detected with difficulty by radioactive means, the steps of introducing a radioactive substance within the borehole proximate to the said stratum, of exposing the said stratum to the said radioactive substance, whereby the said stratum will exhibit a stronger radioactivity than before, and of lowering a detecting apparatus proximate to the said stratum to detect the presence thereof.

8. A method as in claim 4, in which the change within the boreholes includes retention of the radioactive material by solution within the borehole.

9. A method as in claim 4, in which the radioactive material is oil soluble and dissolves in oil bearing layers within the borehole.

10. A method as in claim 4, in which the radioactive material is gaseous in nature.

11. A method as in claim 4, in which the radioactive material is radium emanation.

SHELLEY KRASNOW.
LEON F. CURTISS.

REFERENCES CITED

The following references are of record in the file of this patent:

UNITED STATES PATENTS

| Number | Name | Date |
| --- | --- | --- |
| 2,133,776 | Bender | Oct. 18, 1938 |
| 2,197,453 | Hassler | Apr. 16, 1940 |
| 2,220,205 | Buckley | Nov. 5, 1940 |
| 2,220,509 | Brons | Nov. 5, 1940 |
| 2,228,623 | Ennis | Jan. 14, 1941 |
| 2,308,176 | Howell | Jan. 12, 1943 |
| 2,308,361 | Fearon | Jan. 12, 1943 |
| 2,320,643 | Neufeld | June 1, 1943 |
| 2,320,890 | Russell | June 1, 1943 |
| 2,339,129 | Albertson | Jan. 11, 1944 |